Oct. 31, 1939.         L. D. BRITTON ET AL         2,177,934
                    VEHICLE SUSPENSION SYSTEM
              Filed March 1, 1938        3 Sheets-Sheet 1

INVENTORS.
Loren D. Britton and Eugene J. Hardig
BY Walter E. Schirmer
ATTORNEY.

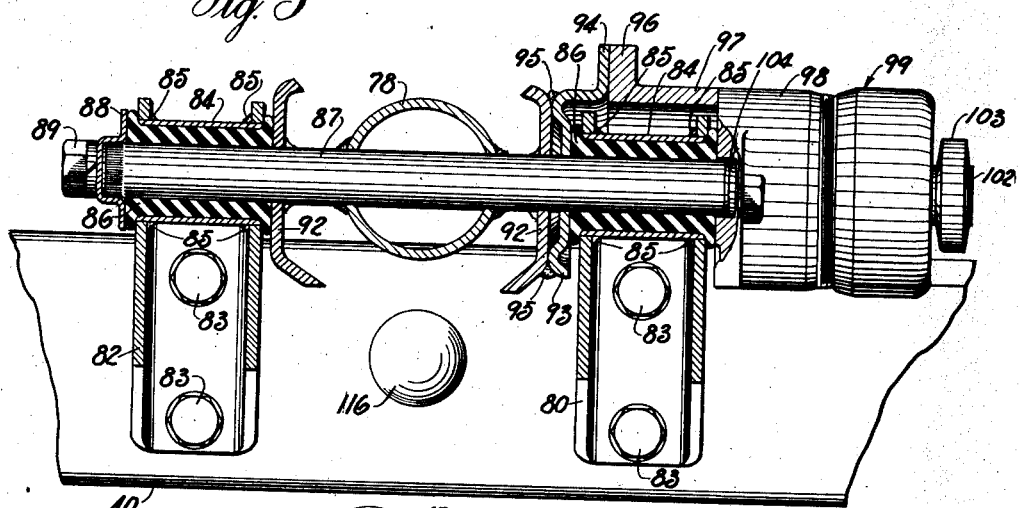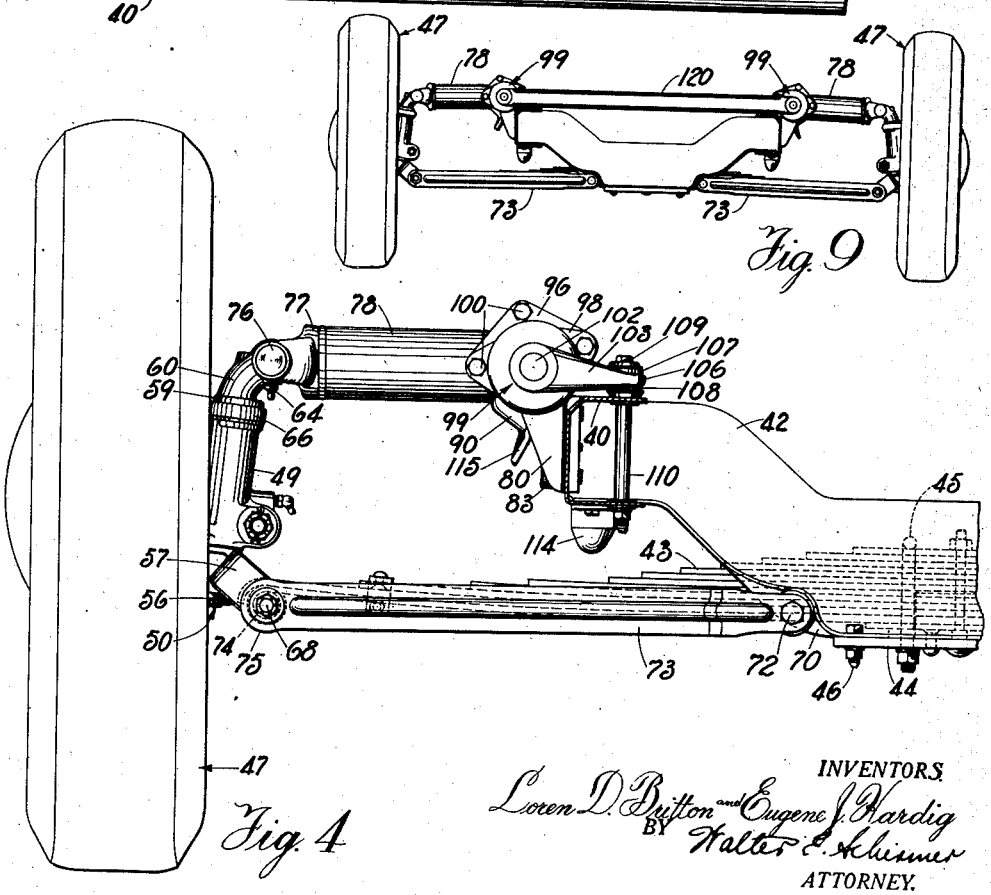

Oct. 31, 1939.  L. D. BRITTON ET AL  2,177,934
VEHICLE SUSPENSION SYSTEM
Filed March 1, 1938   3 Sheets-Sheet 3
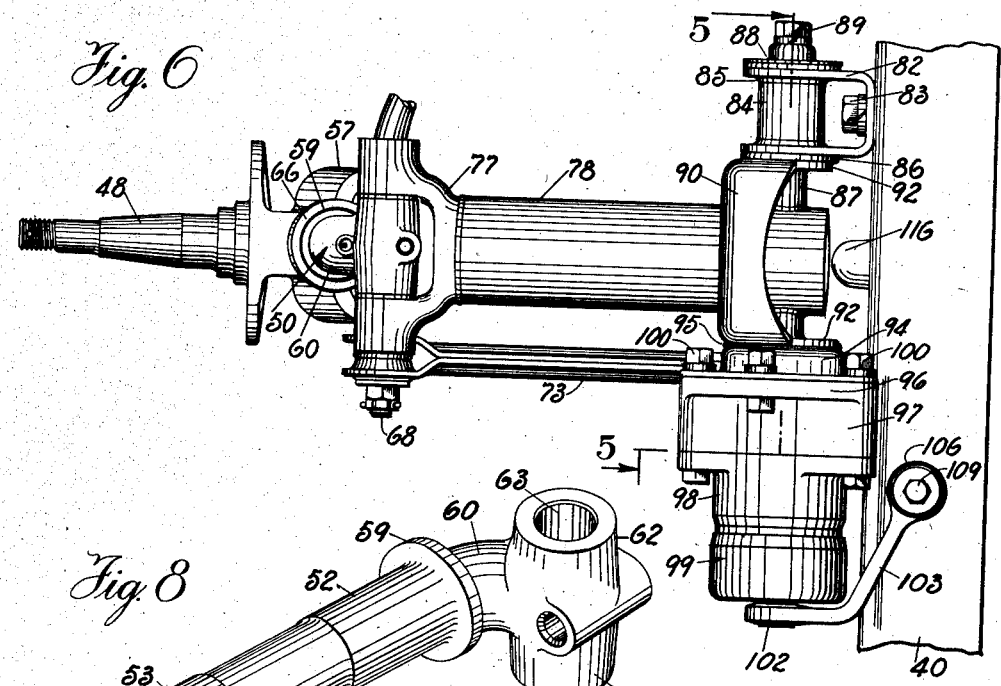
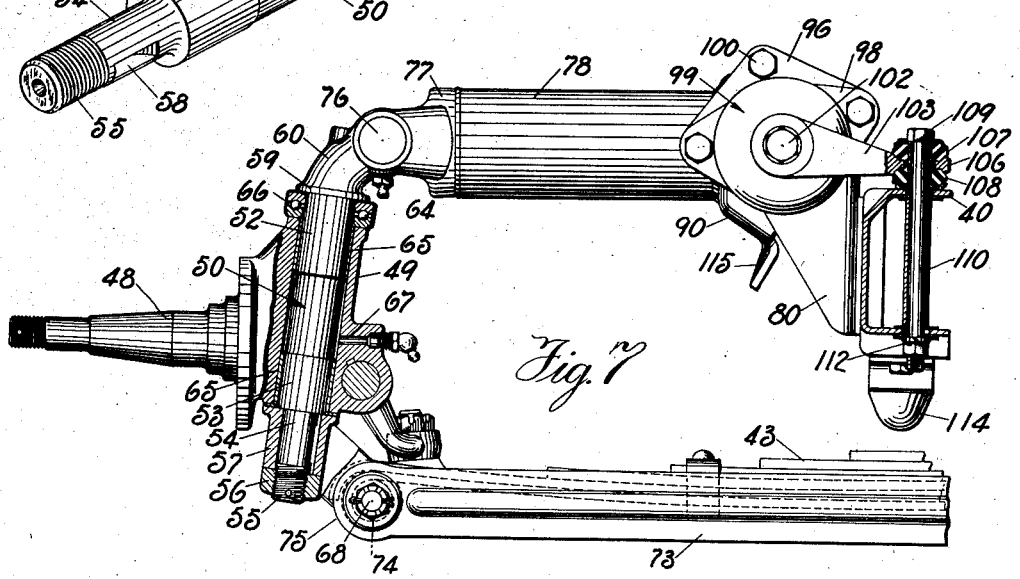
INVENTORS.
Loren D. Britton and Eugene J. Hardig
BY Walter E. Schirmer
ATTORNEY.

Patented Oct. 31, 1939

2,177,934

UNITED STATES PATENT OFFICE 2,177,934

VEHICLE SUSPENSION SYSTEM

Loren D. Britton, Mishawaka, and Eugene J. Hardig, South Bend, Ind., assignors to The Studebaker Corporation, South Bend, Ind., a corporation of Delaware Application March 1, 1938, Serial No. 193,314

11 Claims. (Cl. 280—96.2)

This invention relates to suspension means for vehicles and more particularly is directed to a front wheel suspension system for automobiles, busses and similar vehicles.

In its broader concept, the present invention contemplates a front wheel suspension employing relatively few parts as compared to the present types of suspension with which we are familiar, and which can be easily and economically manufactured and assembled.

One of the primary objects of the present invention is to provide a king pin member upon which the wheel spindle is journaled, which at its upper end is connected to an arm pivotally mounted on the frame for vertical oscillation, but is rigidly restrained against lateral or transverse movement, and forms the strut which retains the wheel in fixed position longitudinally of the vehicle.

In this connection we preferably employ a shock absorber secured to and rotating with the frame end of the arm independently of the pivotal support of the arm on the frame, and having a shock absorber arm reacting against the frame. This is of distinct advantage in that freezing of the shock absorber and damage thereto in no way affects the pivotal support of the arm on the frame.

Another object of the present invention is to provide for reinforcing connection of the leaf spring to the lower end of the king pin member, whereby the danger of wheel collapse due to fracture of a spring leaf is eliminated. In this connection we also employ a safety link pivotally connected at one end to the frame at the point of flexure of the leaf spring, and at its opposite end pivotally connected to the lower end of the king pin.

Still another feature of the present invention is the provision of shock absorbing means mounted coaxially of the pivot journal of the strut or arm on the frame, and has an arm connected to the frame or to a second shock absorbing means for checking the vertical oscillation of the rigid arm due to vertical shocks transmitted thereto from the king pin.

Another advantage secured by the present invention is the limiting of vertical oscillation of the wheel suspension system by means of rubber cushioning members secured to the frame and selectively engaged either by the spring or the vertically oscillating arm to limit by a resilient cushioning action extreme movement in either direction.

Still another advantageous feature of the invention is the provision of a single one piece king pin member which takes the place of forgings formerly employed, and which at its upper end is formed with an integral transverse journal in which the end of the vertically oscillating arm is rotatably supported.

Other objects and advantages of the invention, such as simplicity of design and construction, will be more apparent from the following detailed description which, taken in conjunction with the accompanying drawings, will disclose to those skilled in the art the construction and operation of a preferred form of the present invention.

In the drawings:

Figure 4 is a front elevational view of another form of the present invention;

Figure 5 is a sectional view taken substantially on line 5—5 of Figure 6;

Figure 6 is an enlarged top plan view of the structure shown in Figure 4;

Figure 7 is a front elevational view, partly in section, showing the detailed mounting of the wheel spindle and king pin member;

Figure 8 is a perspective view of the king pin member; and

Figure 9 is a somewhat diagrammatic view of a slightly modified structure.

Figure 2:
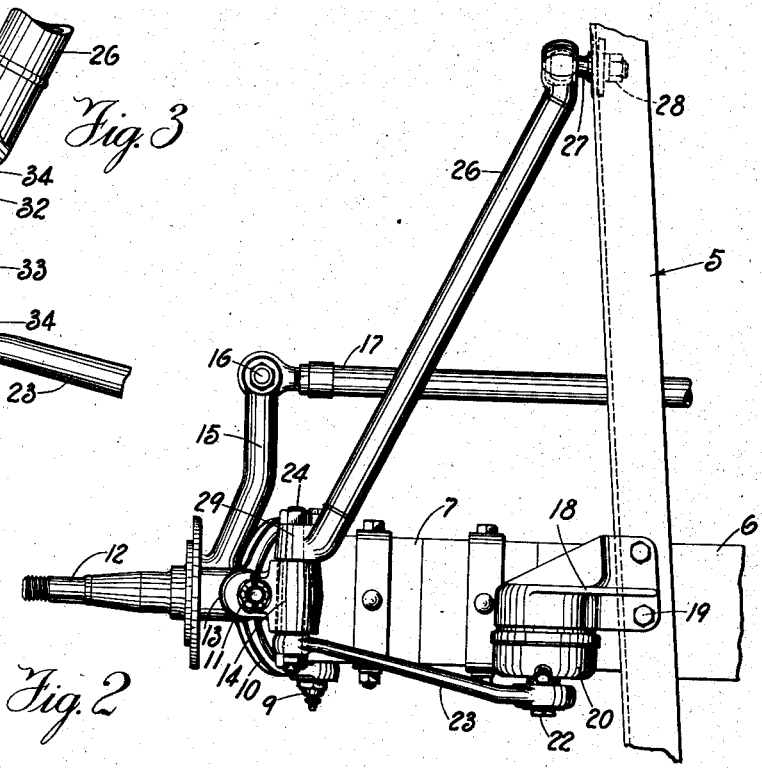
Figure 2 is a top plan view of the structure shown in Figure 1.
Figure 1:
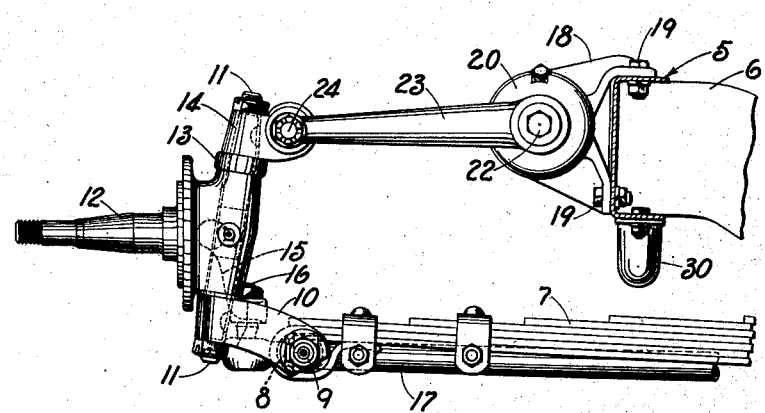
Figure 1 is a front elevational view, partly in section, of one form of the present invention.

Referring now more in detail to the embodiment of the invention shown in Figures 1 and 2 the side rail of the frame is indicated generally at 5 and at its forward end is provided with a transverse cross member 6 which connects the two side rails together. A transversely extending leaf spring indicated generally at 7 is rigidly secured at its center to the central portion of the cross member 6 and at its outer end is provided with an eye 8 which engages a suitable pin 9 carried by the member 10 which is keyed or otherwise rigidly secured to the king pin 11. The king pin 11 is adapted to provide a journal support for the wheel spindle indicated generally at 12 there being a thrust bearing 13 between the member 14 carried adjacent the upper end of the king pin and the upper edge of the journal portion of the wheel spindle. A suitable steering knuckle 15 is secured to the spindle 12 and through the pin 16 is connected to the tie rod 17 extending substantially transversely of the vehicle as indicated more in detail in Figure 2.

The side rail 5 is provided with a bracket 18 secured thereto by means of bolts 19 adjacent the point at which the cross member 6 is connected to the side rail. The bracket 18 forms a support for the housing 20 of a shock absorber and is adapted to support the shock absorber in fixed position against rotation of the housing 20 with respect thereto. The shock absorber 20 is provided with a shaft 22 to which is rigidly connected the arm 23 which extends transversely of the frame 5 and is connected at its opposite end to the pin 24 extending through the member 14 keyed to the upper end of the king pin 11. This provides for the reaction of the vertical movement of the king pin with respect to the frame 5 being absorbed by the shock absorber through the arm 23 and the bracket 18.

In the particular construction shown in Figures 1 and 2 we find it necessary to provide some means of holding the king pin and the parts connected thereto against displacement longitudinally of the vehicle. To accomplish this we preferably provide an arm or strut member 26 which at one end is provided with universal support upon a stud 27 secured rigidly to the web portion of the side rail 5 by means of the nut 28. At its opposite end of the arm 26 is provided with an offset portion 29 which is adapted to engage about the opposite end of the pin 24 on the opposite side of the member 14. This provides for retaining the king pin in vertical position regardless of its vertical oscillation due to shock imparted thereto through the wheel supported upon the spindle 12.

It will be noted from this construction that the spring 7, the arm 23 and the king pin 14 together with the frame of the vehicle form a substantial parallelogram with the arm 23 and the spring 7 tending to cushion and control vertical movement of the king pin and wheel spindle due to road shocks. In order to limit the vertical flexure of the spring 7 we preferably provide a rubber bumper member 30 which is disposed on the underface of the vertical flange of the channel 5 directly above the spring 7 so that the uppermost spring leaf will move into contact therewith when the spring reaches a predetermined limiting point of flexure. By reason of the diagonally extending strut 26 any lateral movement of the king pin out of its plane of oscillation is prevented. In practice we have found that the arm 23 of the shock absorber is not of sufficient rigidity to maintain the king pin in a vertical plane during oscillation without the provision of some type of arm or strut member which is so fixed in position as to prevent any lateral oscillation of the king pin 11.

Figure 3:
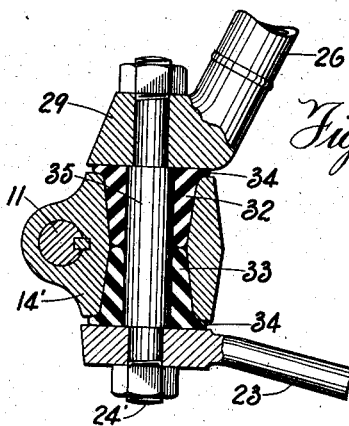
Figure 3 is an enlarged sectional view through a modified form of bearing employed in the structure shown in Figures 1 and 2.

In Figure 3 we provide a modified type of bearing arrangement in which the pin 24' carried by the bracket 14' secured to the upper end of the king pin 11 is resiliently cushioned by means of tapered rubber bushings indicated at 32 and 33. These bushings have a tapered body portion positioned within oppositely extending conical recesses of the member 14 and preferably are provided with radial flange portions 34 at their larger ends which form suitable cushioning means between the arms 23 and 26 and the member 14'. Preferably in such a construction the pin 24' is provided with a central shoulder portion 35 which limits the relative movement of the arms 26 and 23 axially of the pin 24' so that no undue compression of the rubber bearings 32 and 33 is produced.

With such a journal construction as shown in Figure 3 the lubrication of the pin 24 is eliminated and a quiet and efficiently cushioned pivotal support for the arms 26 and 23 is provided.

Referring now in detail to the embodiment of the invention shown in Figures 4 to 8, we have provided a vehicle frame comprising side rail members 40 which at their forward ends are provided with a transverse drop center frame member 42 providing a rigid spacing member between the side rails 40. As shown clearly in Figure 4 the transverse leaf spring 43 is suitably clamped to a plate member 44 by means of U-bolts 45 and the plate in turn is rigidly secured to the center of the cross member 42 by means of the bolts 46. This provides a positive and rigid mounting of the spring 43 at its center to the center of the cross frame member 42 so that the extending ends of the spring can each be considered as individual spring members.

A wheel indicated generally at 47 is preferably mounted in any desired manner upon the wheel spindle 48 shown more in detail in Figure 7 and the wheel spindle 48 is provided with a journal portion 49 adapted to be mounted upon a king pin member indicated generally at 50. The king pin member is shown in detail in Figure 8.

Referring now in detail to this member, it comprises a shank portion which has axially spaced cylindrical bearing surfaces 52 and 53, the shank of the king pin 50 below the bearing surface 53 being reduced in diameter as indicated at 54 and being threaded at its end as indicated at 55 to receive a castellated nut 56 for securing the leaf spring bracket 57 thereto, a suitable keyway 58 formed in the lateral surface of the portion 54 of the king pin surface to key the bracket 57 against rotation relative to the pin 50.

Adjacent to its upper end the king pin 52 is provided with a radial flange portion 59 and then has a normally extending projection indicated generally at 60 which is provided with laterally extending boss portions 62 defining a transverse opening 63 which is suitably lubricated through a lubricant fitting 64 extending normal thereto.

As clearly shown in Figure 7, the king pin has the journal portion 49 of the wheel spindle 48 rotatably mounted thereon by means of bushings or journal sleeves 65 which are disposed between the bearing surfaces 52 and 53 and the internal surface of the journal 49. At its upper end a suitable thrust bearing indicated generally at 66 is provided beneath the lower face of the flange 59 and the upper face of the journal portion of the wheel spindle 48. Lubricant is admitted to the bearing sleeves 65 through a lubricant opening 67 formed in the spindle 48 as shown clearly in Figure 7.

The leaf spring 43 preferably has the two bottom leaves thereof rolled at their outer ends to form a spring eye through which the stud 68 is adapted to extend to secure the spring to the bracket 57. It will be noted that the upper of the two spring leaves extends only partially around the periphery of the lower spring leaf at the spring eye portion but overlaps the upper portion of the pin 68 a sufficient extent so that fracture of the inner spring eye will not result in the possibility of the spring becoming disengaged from the stud 68.

As noted clearly in Figure 4 the transverse cross member 42 of the frame is provided with a recessed portion 70 from which projects the pin 72 on which one end of a link 73 is pivotally mounted, preferably by means of rubber bushings. The opposite end of the link 73 is suitably journaled by means of rubber bushings 74 on the pin 68 as indicated generally at 75. This link 73 serves as a connection between the cross member 42 and the lower end of the king pin and provides for lateral control of the position of the lower end of the king pin in the event of fracture or damage of the leaf spring. Preferably the pin 72 is located as close as possible to the center of flexure of the extending half of the leaf spring 43 shown in Figure 4.

At its upper end the king pin extension 60 is adapted to receive the pin member 76 which extends therethrough and provides for pivotal support of the forked end 77 of a tubular arm 78 whereby the arm is pivotally mounted on the upper end of the king pin, preferably by means of a bronze or rubber bushing provided between the pin 76 and the internal surfaces of the journal opening 63 and the journal openings in the arms of the forked member 77. This prevents any relative angular displacement between the arm 78 and the king pin 50 and maintains the two in longitudinal alinement regardless of their relative rotated positions.

Referring now in more detail to Figures 5 and 6, it will be noted that the side rail of the channel 40 is provided with a pair of spaced bracket members 80 and 82 which may be secured thereto by welding or by means of bolts 83, or the like. These brackets are of generally channel formation and are provided with flange portions which project outwardly away from the side face of the channel 40 and are suitably apertured to provide journal openings extending through the sleeve members 84 which sleeve members are positioned within the apertures in the flanges and are suitably welded or otherwise rigidly secured therein as indicated at 85.

Each of the sleeves 84 is adapted to receive a rubber bushing as indicated at 86, which rubber bushings are of generally cylindrical form with radially extending flange portions at their opposite ends. A suitable shaft 87 is adapted to be journaled within the bushings 86 and at its other end is secured against axial movement in one direction by means of a washer 88 which is locked thereto by means of the nut 89. The shaft 87 therefore provides a pivotal support which is journaled for rotation within the bushings 86 carried by the two brackets 80 and 82. Between the brackets the shaft 87 extends through the end of the arm 78 as indicated clearly in Figures 5 and 6, and the arm 78 is also preferably provided with the bracket member 90 which is welded or otherwise rigidly secured thereto and which has parallel extending flange portions 92 adapted to engage the adjacent flanged end of the bushing 86 disposed in the bracket 82 and the adjacent face 93 of a cap member 94, which is rigidly secured to the flange 92 as by means of an annular ring weld 95.

It will thus be seen that the arm 78 as well as the member 90 is mounted for relative vertical oscillation about the axis of the shaft 87 journaled within the bushings 86 of the brackets 80 and 82. The bracket 94 is bolted or otherwise suitably secured to the flange 96 of a casting 97 which in turn forms a support for the housing 98 of a shock absorber indicated generally at 99. The connection between the bracket 94 and the flange 96 is preferably by means of bolts 100 as indicated in Figure 6 for a purpose to be described in detail hereinafter.

The shock absorber 99 is provided with a central shaft portion 102 to which is rigidly secured one end of an arm 103. It will be noted that the housing 98 is provided with a central axial recess in the end thereof adjacent the bracket 80 as indicated at 104. This recess is adapted to provide for clearance of the adjacent end of the shaft 87 so that the shock absorber housing 98 as well as the entire shock absorbing mechanism indicated generally at 99, while mounted axially of the shaft 87, is entirely independent thereof and is free to rotate relative to this shaft if the connection between the brackets 94 and 96 is released.

Considering now in more detail Figures 4 and 7, it will be noted that the arm 103 of the shock absorber has a normally turned end 106 which is adapted to be secured between a pair of rubber abutment members 107 and 108 carried on a pin 109 extending through the horizontal flanges of the member 40. The pin 109 between the flanges of the member 40 is provided with a spacer sleeve 110 and at its lower end is secured against vertical movement by means of the nut 112 threaded thereover. Thus the pin 109 together with the rubber abutments 107 and 108 provides a cushioned anchor for the extended end of the shock absorber arm 103 and prevents the same from moving relative to the frame. The shock absorber 99 and the housing 98 are adapted to move or rotate about the axis of the shaft 87 as a center upon rocking movement of the arm 78, and consequently sudden shocks transmitted to the arm 78 are cushioned by the reaction between the anchored end of the arm 103 and the bracket 94 connected to the shock absorber housing.

In the event that the shock absorber for some reason should fail to function, such as in the case of extremely cold weather when the liquid therein might freeze, it is possible that the arm 103 may be broken upon vertical oscillation of the wheel suspension system or that the studs or bolts 100 may be sheared by reason of their connection between the oscillating arm 88 and the shock absorber housing 98. However, in such a case the shearing of the bolts 100 or breaking of the arm 103 will in no wise affect the support of the arm 78 on the brackets 80 and 82 since this support is entirely independent of the shock absorber mounting and consequently the arm 78 will under such conditions still be rigidly supported against any transverse or lateral movement and will still be free to oscillate in a vertical plane upon vertical movement of the king pin 50.

It is therefore apparent that the arm 78 is rigidly supported against movement except in a vertical plane normal to the axis of the shaft 87. At the same time, due to the rigid support of the upper end of the king pin in the forked end 77 of the arm 78, it is apparent that the king pin is not capable of moving out of vertical alinement with reference to the arm 78 and consequently both the arm and the king pin will be prevented from moving except in a vertical plane due to shocks imposed upon the wheel spindle 48. Similarly, the spring 43 and control link 73 must move in a vertical plane and thus control the movement of the lower end of the king pin 50 so that the entire assembly is limited against any lateral or buckling action and is controlled to move only in a vertical plane passing through the longitudinal center of arm 78 and spring 43.

In order to limit the upward flexure of the spring 43 we preferably provide a rubber bumper 114 secured to the lower or undersurface of the frame member 40 and which engages the upper surface of the spring 43 to thereby limit its upward flexure under severe shocks. At the same time it has been found desirable to limit the possible counterclockwise movement of the arm 78 about its pivotal support on the frame and for this reason the member 90 is provided with an outwardly directed flange or abutment 115 which is disposed between the brackets 80 and 82 and is adapted to engage the rubber bumper 116 secured in the side wall of the frame member 40 as indicated clearly in Figures 5 and 6. This cushions the movement of the spring suspension in a downward direction and the bumper 114 provides a resilient cushion for limiting the movement of the suspension in an upward direction.

In Figure 9 we have shown a modified form of the invention which is substantially similar to the modification shown in Figures 4 to 8 with the exception that the shock absorbers 99 are cross connected by means of an arm 120 which takes the place of separate arms 103 whereby any shocks transmitted to either one of the shock absorbers 99 produces a counter reaction at the other shock absorber whereby the anchoring arrangement shown in detail in Figure 7 may be eliminated. In other respects the suspension system is the same as that described in the previous embodiment and the action of the system in the operation of the vehicle remains substantially the same due to this cross connection between the shock absorber shafts.

It is believed obvious that the present construction is relatively simple in design, requires only few parts as compared to the previous systems and has a high degree of safety since regardless of the breaking of a shock absorber or fracture of a spring leaf or the like the system still remains fully operative so far as wheel alinement and wheel position is concerned and prevents any lateral distortion or buckling of the wheel assembly.

We are aware that various changes and modifications may be made in certain details of the illustrated embodiment of our invention disclosed herein and we therefore do not intend to be limited except as defined by the scope and spirit of the appended claims.

We claim:

1. A wheel suspension system comprising a wheel spindle, a king pin forming a journal support for said spindle, a vehicle frame, a leaf spring extending transversely across said frame and rigidly secured thereto at its center, means on the lower end of said king pin for pivoting one end of said spring, an integral bearing formed at the upper end of said king pin, an arm journaled in said king pin journal at one end and having a head portion at its opposite end pivotally supported at longitudinally spaced points on said frame for vertical oscillation transversely with respect to said frame, and shock cushioning means supported on said head portion and reacting between said arm and frame.

2. The combination with a vehicle frame having side rails and a cross member at the forward end thereof, a transverse leaf spring rigidly secured at its center to said cross member, a pair of journal brackets secured to said side rail above said spring, an arm extending transversely to one of said side rails having a head portion journaled in said brackets, shock absorbing means carried by said head portion and having an arm reacting against said frame, and a king pin forming a journal support for a wheel spindle and having said spring end and the free end of said arm pivotally secured to opposite ends thereof whereby said king pin is movable relatively vertically upon flexure of said spring and rotation of said arm about said brackets.

3. The combination, with a vehicle having a frame comprising channel-shaped side rails and a front cross member, of a T-shaped arm having a head portion journaled for vertical oscillation on the outer face of one of said side rails, a transverse spring rigidly secured at its center to said cross member and extending beneath said arm, a king pin providing a journal support for a wheel spindle, said king pin having means at opposite ends thereof for pivotally supporting the outer ends of said spring and arm, and shock absorbing means supported at one end of said head portion and having an arm reacting between said T-shaped arm and the frame portions of said rail.

4. The combination of claim 3 further characterized in the provision of rubber bumper means depending from said side rail beneath said arm for limiting upward flexure of said spring.

5. The combination of claim 3 further characterized in the provision of rubber bumper means between said arm and side rail limiting downward movement of said arm.

6. The combination of claim 3 further characterized in the provision of a rigid link pivotally connected at one end to the pivotal support of said spring on said king pin and pivotally connected with said cross member adjacent the center point of spring flexure.

7. In a vehicle, a front wheel suspension system including a king pin pivotally connected at one end to the end of a transverse spring member, an arm extending generally parallel to and vertically spaced above said spring, one end of said arm being pivoted in the upper end of said king pin, said arm having a head portion on its opposite end, a transverse shaft extending therethrough, means for supporting said shaft on the vehicle frame, and a shock absorber secured on one lateral face of said head portion coaxially of said shaft, said shock absorber reacting between said arm and frame.

8. The combination, with a vehicle frame, of a front wheel suspension system including a transverse leaf spring secured at its center to said frame, a king pin having means at its lower end upon which at least two of said spring leaves are pivotally supported, an arm above said spring extending transversely to said frame and pivoted at one end in the upper end of said king pin, brackets secured to the side of said frame, a cross shaft journaled at opposite ends in said brackets, said arm having a bracket at its other end secured on said shaft, a cylindrical shock absorber having means rigidly securing the same to said arm bracket out of contact with said shaft, and reacting means on said shock absorber engaging said frame.

9. In combination, a king pin wheel spindle journal member, means extending laterally from opposite ends of said king pin and lying in the same vertical plane, one of said means comprising a spring member and the other comprising a strut member, a frame and means for pivotally mounting the free end of said strut member thereon comprising a pair of spaced brackets, a shaft journaled therein for rotation, said strut member being connected to said shaft intermediate said brackets, and shock absorbing means reacting between said shaft and said frame limiting rotational movement of said strut member in one direction relative to said frame.

10. In combination, a vehicle side rail, a pair of brackets secured in spaced relation on the side face of said rail, a quadrilateral wheel suspension including a transverse spring, a king pin and an arm pivotally connected together, resilient bushings in said brackets having flanged ends, and a shaft supported in said bushings, said arm having a flanged head portion secured to said shaft intermediate said brackets with the flanges bearing against the adjacent bushing end flanges.

11. In a wheel suspension of the class described including an arm pivotally connected at one end to a king pin and extending transversely toward a vehicle frame side rail, a head portion on said arm including laterally spaced flanges, a shaft extending transversely through said head portion and flanges and secured thereto, spaced brackets on the side rail supporting opposite ends of said shaft, a shock absorber disposed coaxially of said shaft and secured to one end of said flanges, and a shock absorber lever having cushioned engagement with the side rail to react between said rail and shaft upon oscillation of said arm.

LOREN D. BRITTON.
EUGENE J. HARDIG.